Nov. 4, 1958 W. R. LUNDRY 2,859,414

DELAY NETWORK

Filed Feb. 4, 1954 3 Sheets-Sheet 1

INVENTOR
W. R. LUNDRY
BY
Ralph T. Holcomb
ATTORNEY

Nov. 4, 1958 W. R. LUNDRY 2,859,414

DELAY NETWORK

Filed Feb. 4, 1954 3 Sheets-Sheet 2

INVENTOR
W. R. LUNDRY
BY
Ralph P. Holcomb
ATTORNEY

INVENTOR
W. R. LUNDRY
BY
Ralph P. Holcomb
ATTORNEY

United States Patent Office 2,859,414

Patented Nov. 4, 1958

2,859,414

DELAY NETWORK

Walter R. Lundry, Summit, N. J., assignor to Bell Telephone Laboratories, Incorporated, New York, N. Y., a corporation of New York Application February 4, 1954, Serial No. 408,241

9 Claims. (Cl. 333—29)

This invention relates to wave transmission networks and more particularly to constant-loss structures adapted for use as phase shifters or delay networks.

An object of the invention is to shift the phase of a transmitted signal wave without introducing attenuation distortion. More specific objects are to reduce the size and cost, improve the transmission characteristic, and facilitate the adjustment of phase-shifting networks.

For high quality transmission over long transmission circuits, it is necessary to correct the phase distortion, as well as the attenuation distortion, of the transmitted signal. Phase-shifting networks, or delay equalizers, are employed for this purpose. Such phase-compensating networks are particularly required in transmission circuits carrying television, high fidelity program, or telephoto circuits.

The phase-shifting networks in accordance with the present invention comprise two substantially independent transmission paths connected in parallel between a source of signal waves and a load. One of the paths has a transmission loss which varies between one or more minima and one or more maxima, depending upon the phase shift or delay characteristic desired. In order to make the insertion loss of the network substantially constant over the operating frequency range, the other path has a substantially constant loss which is approximately six decibels greater than the minima and the paths have phase shifts which differ by $\pi$ radians at the frequencies of the minimum and maximum loss. This phase difference may be provided by properly poling the connections to the transmission paths, by including one or more amplifiers in the paths, or by using a transformer in one of them. The variable loss may be provided by a constant-resistance network, a single reactive series or shunt impedance branch, or by an active or passive resistance-capacitance or resistance-inductance network. Also, means associated with at least one of the paths are included for preventing undesired interaction between the two paths, thereby making them substantially independent of each other. In one embodiment of the invention, these isolating means comprise a splitting network at the input end of the system and a combining network at the output end. Each of these networks may comprise a hybrid coil. One or more amplifiers may be included in one or both of the transmission paths, either in addition to or in lieu of the splitting and combining networks. Also, a series resistor may be included in the variable loss path to reduce interaction.

For a simple type of delay characteristic, the reactive impedance in the variable-loss path may be a single inductor or a single capacitor. For a more complex delay characteristic, including one of the harmonic type, the reactive impedance requires additional reactive elements to provide one or more resonances and one or more antiresonances. In this case, the reactive impedance may comprise a plurality of tandem-connected, phase-shifting networks terminated at the remote end in a zero or an infinite impedance, with an impedance discontinuity at the input end and at each junction point between the networks. An adjustable delay characteristic may be provided by adjusting one or more component reactors in the reactive impedance.

The nature of the invention and its various objects, features, and advantages will appear more fully in the following detailed description of preferred embodiments illustrated in the accompanying drawing, of which Fig. 1 shows the general circuit of one form of a phase-shifting or delay network in accordance with the invention comprising two transmission paths connected in parallel between a splitting network N1 and a combining network N2;

Figure 1:
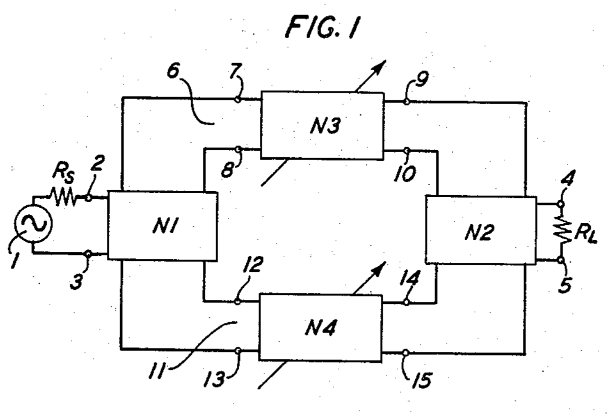
Figure 14:
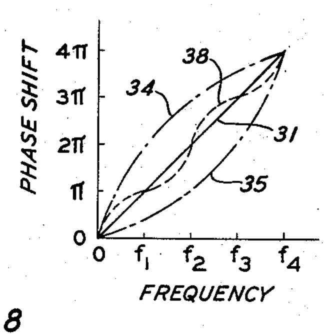
Figure 9:
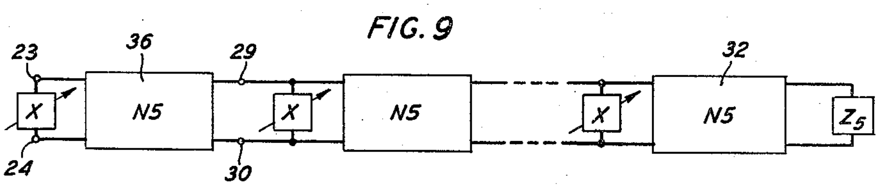
Fig. 9 is a block diagram of another two-terminal impedance suitable for $Z_3$ or $Z_4$, comprising a number of tandem-connected, phase-shifting networks N5 terminated in a zero or infinite impedance and provided with adjustable impedance discontinuities at the input end and at the junction points.
Figure 15:
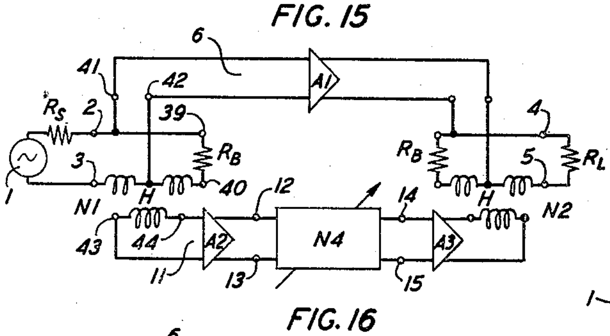
Figure 17:
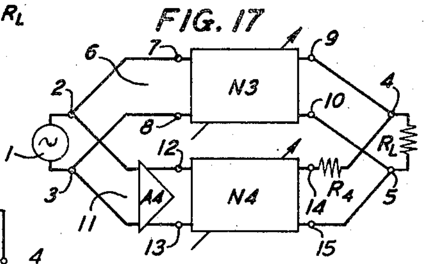
Figure 16:
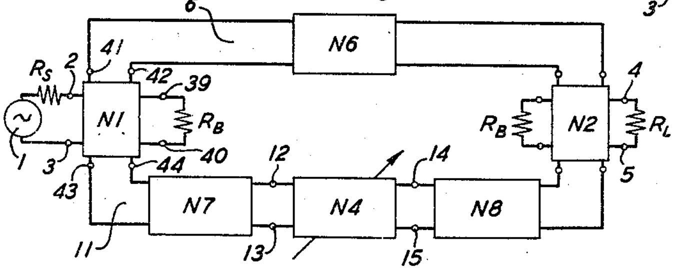
Figure 18:
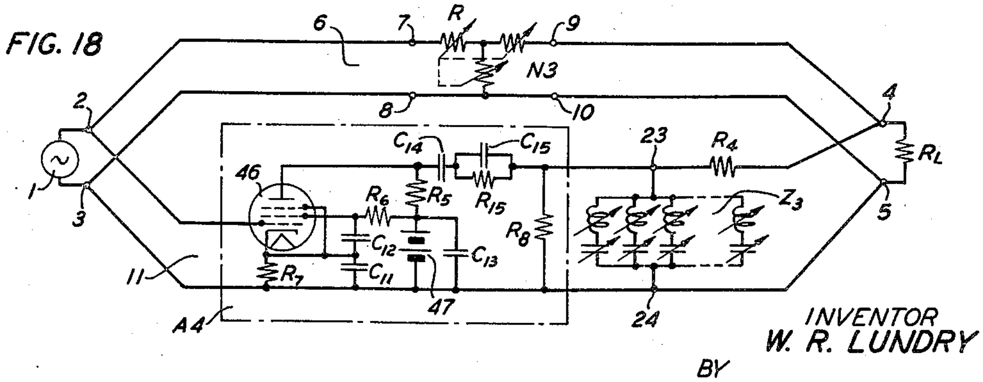
Figure 19:
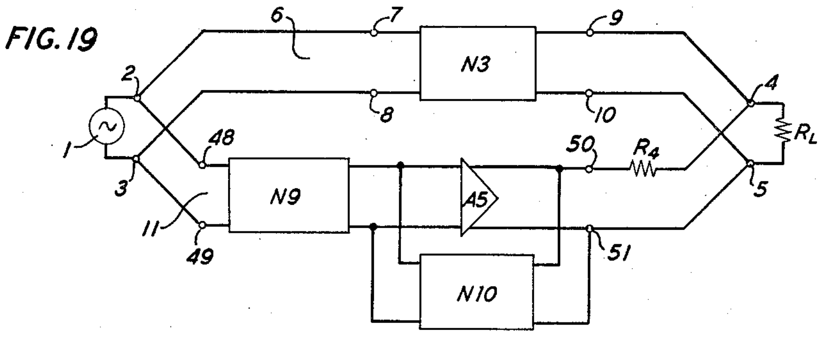
Figure 20:
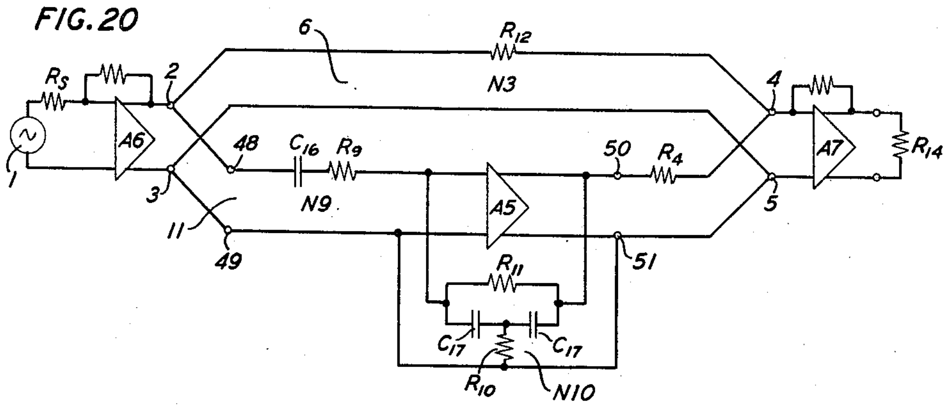
Figure 21:
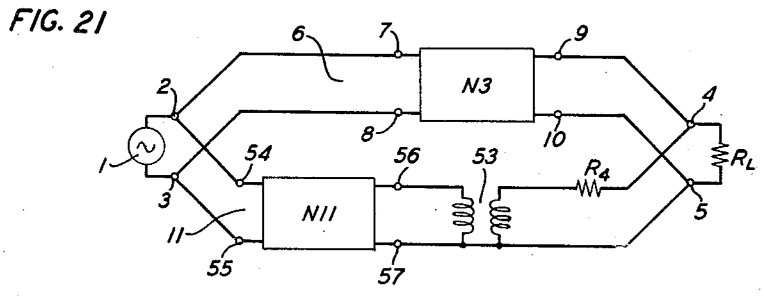
Figure 22:
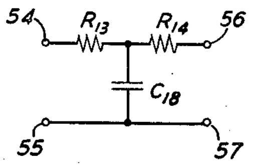

Figs. 10, 11, 12, and 13 show schematically four different circuits suitable for the network N5 of Fig. 9;

Fig. 14 shows typical phase-frequency characteristics obtainable with the impedance branch of Fig. 9;

Fig. 15 shows a network circuit similar to Fig. 1 in which the networks N1 and N2 include hybrid coils and the amplifiers A1, A2, and A3 have been added to improve the input and output impedances;

Fig. 16 shows a modification of Fig. 15 in which the amplifiers are replaced by the networks N6, N7, and N8, which may be attenuators or loss equalizers;

Fig. 17 shows another phase-shifting network in accordance with the invention in which the networks N1 and N2 have been omitted but an amplifier A4 and a series resistor included in the lower transmission path to reduce interaction;

Fig. 18 shows a specific embodiment of the network of Fig. 17;

Fig. 19 shows a modification of Fig. 17 in which A4 and N4 are replaced by an active network requiring only one type of reactor;

Fig. 20 shows a specific embodiment of the network of Fig. 19 in which the reactors are capacitors;

Fig. 21 shows another modification of Fig. 17 in which A4 and N4 are replaced by a transformer and a passive network N11; and Fig. 22 shows schematically a circuit suitable for the network N11 of Fig. 21.

Fig. 1 shows a phase-shifting network in accordance with the invention connected between a source 1 of alternating-current signals having an internal impedance $R_S$ and a load impedance $R_L$. The impedances $R_S$ and $R_L$ are preferably substantially non-reactive but they may be equal or unequal. The source 1 is connected to the input terminals 2 and 3 of a splitting network N1. The load $R_L$ is connected to the output terminals 4 and 5 of a combining network N2. Two substantially independent transmission paths which differ in phase shift by $\pi$ radians are connected in parallel between the networks N1 and N2. This required difference in phase shift may be obtained by properly poling the connections of the paths to the networks N1 and N2. The upper path 6 includes a network N3 having input terminals 7, 8 and output terminals 9, 10. The lower path 11 comprises a network N4 with input terminals 12, 13 and output terminals 14, 15. The networks N1 and N2 substantially prevent undesired interaction between the two transmission paths. The network N4 introduces into the path 11 a transmission loss which varies between one or more minima and one or more maxima. The network N3 introduces into the path 6 a substantially constant transmission loss approximately six decibels greater than the minima in the path 11. Applicant has found that, when the path 6 has this value of loss, the over-all network between the input terminals 2, 3 and the output terminals 4, 5 will have a substantially constant insertion loss throughout the operating frequency range and that the insertion phase shift will depend only upon the transmission in the path 11. The phase shift may be adjusted by adjusting the transmission of the network N4, as indicated by the arrow. The network N3 also may be made adjustable, as indicated, if desired.

Figure 2:
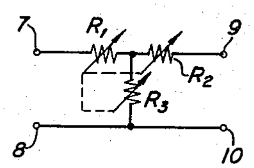
Fig. 2 shows schematically an attenuator suitable for use as the network N3 in the upper path of Fig. 1.

Fig. 2 shows an attenuator circuit suitable for the network N3 of Fig. 1, with the terminals similarly numbered. The network comprises two series resistors $R_1$, $R_2$ and an interposed shunt resistor $R_3$. These resistors may be adjustable and may be under a unitary control, as indicated. In some applications, a single series resistor is sufficient. In this case, the resistors $R_2$ and $R_3$ may be omitted.

Figure 3:
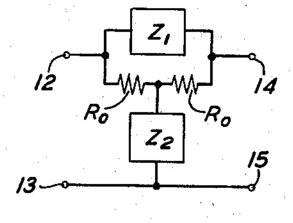
Fig. 3 is the schematic circuit of a constant-resistance, bridged-T structure suitable for use as the network N4 in the lower path of Fig. 1.

Fig. 3 shows a bridged-T structure suitable for the variable-loss network N4 of Fig. 1 when it is desired to provide an image impedance $R_0$ which is a constant resistance at all frequencies. The terminals are similarly designated in both figures. The network comprises two equal series resistors each of value $R_0$, an interposed shunt impedance branch $Z_2$, and a bridging impedance branch $Z_1$. Each of the impedances $Z_1$ and $Z_2$ is ordinarily purely reactive, and their product is equal to $R_0^2$. The phase shift, and the associated delay, obtainable in the network of Fig. 1 depends upon the complexity and configuration of the impedances $Z_1$ and $Z_2$. In the simplest case, each may comprise only a single reactor. For example, one may be a capacitor and the other an inductor. For more complex characteristics, one or more inductors or capacitors are added to each of the impedances.

Figure 4:
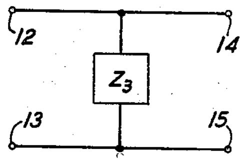
Figs. 4 and 5 show, respectively, a single shunt impedance branch and a single series impedance branch, either of which may be uesd as the network N4.
Figure 5:
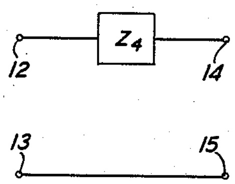

If a constant-resistance image impedance is not required, the network N4 may consist of a single shunt impedance $Z_3$, as shown in Fig. 4, or a single series impedance $Z_4$, as shown in Fig. 5. In order to obtain the same phase characteristic obtainable with the bridged-T network of Fig. 3, $Z_3$ must be equal to $Z_2/2$, and $Z_4$ must be equal to $2Z_1$.

Figure 6:
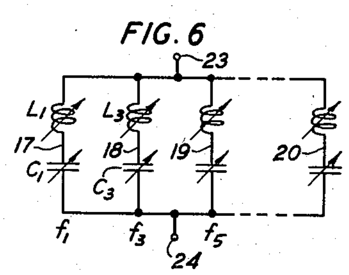
Figs. 6 and 8 are schematic circuits of two different types of impedances which are suitable for the branch $Z_3$ of Fig. 4 or the branch $Z_4$ of Fig. 5.
Figure 8:
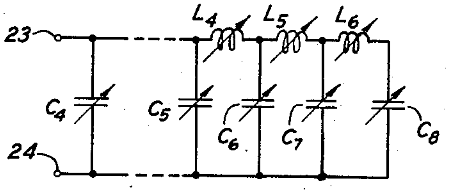

Figs. 6, 8, and 9 show three different types of two-terminal impedances, each of which is suitable for either $Z_3$ or $Z_4$. The structure shown in Fig. 6 is in the Foster form, comprising a number of resonant branches 17, 18, 19, and 20 connected in parallel between the terminals 23 and 24. In some cases, more than forty resonant branches may be employed. Each of the branches comprises an inductor and a capacitor connected in series. In the branch 17 these elements are $L_1$ and $C_1$, and in the branch 18 they are $L_3$ and $C_3$. The first three branches resonate, respectively, at the frequencies $f_1$, $f_3$, and $f_5$, as indicated in Fig. 6. Anti-resonances will occur at the intermediate frequencies $f_2$ and $f_4$.

Figure 7:
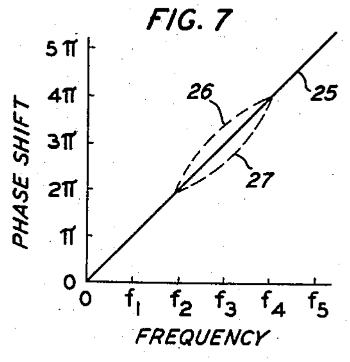
Fig. 7 shows typical phase-frequency characteristics obtainable with the impedance branch of Fig. 6.

The transmission characteristics of a phase-shifting network of the type shown in Fig. 1 in which the network N4 is a single two-terminal shunt impedance $Z_3$ of the type shown in Fig. 6 will now be considered. It will be assumed that the network N3 introduces a constant loss of six decibels. The network between the terminals 2, 3 and 4, 5 will have a substantially constant loss throughout the operating frequency range. If each of the networks N1 and N2 introduces a loss of three decibels, the over-all loss will be 12 decibels. The phase shift is zero at zero frequency, $\pi$, $2\pi$, and $3\pi$ radians, respectively, at the resonant frequencies $f_1$, $f_3$, and $f_5$, and $2\pi$ and $4\pi$, respectively, at the anti-resonant frequencies $f_2$ and $f_4$. If the critical frequencies $f_1$ to $f_5$ are uniformly spaced and the impedance level of the impedance $Z_3$ is appropriately chosen, the phase shift will be approximately linear with frequency, as shown by the solid-line characteristic 25 in Fig. 7. In this case, the impedance $Z_3$ has a magnitude approximately equal to the parallel combination of the impedances looking in either direction from the shunt branch, at a selected frequency within the operating range. A suitable frequency is one midway between a resonant frequency and an anti-resonant frequency, for example, one mid-way between $f_2$ and $f_3$. The impedance level of the impedance $Z_3$ depends upon the stiffness of the resonant branches. Thus, the impedance level of the branch 17 depends upon the ratio $L_1/C_1$. Now, if one or more of the resonant frequencies $f_1$, $f_3$, and $f_5$ are changed, the phase characteristic is correspondingly changed. For example, if the frequency $f_3$ is lowered, the phase shift in the region of $f_3$ is increased, as shown by the broken-line curve 26. Conversely, if $f_3$ is raised, the phase shift is lowered, as shown by the broken-line curve 27. The frequency $f_3$ may be raised by decreasing the value of either the capacitor $C_3$ or the inductor $L_3$, or lowered by increasing the value of either of these elements. The component inductors and capacitors in the impedance $Z_3$ may be made adjustable, as indicated by the arrows in Fig. 6, to permit an adjustment of the phase or delay characteristic. Of course, only one type of element need be made adjustable. When adjustment is restricted to one type of element it is preferably the capacitors. Any intermediate characteristic between the curves 26 and 27 may be obtained by properly adjusting the frequency $f_3$. Thus, a continuously adjustable phase characteristic of the bump type is obtained. Other continuously adjustable bumps of phase shift may be obtained by adjusting the reactors in the branches 17, 19, and 20, thus covering the entire operating frequency range. To avoid complication, these are not shown in Fig. 7.

Fig. 8 shows a two-terminal impedance in the Cauer form which may be used for $Z_3$ or $Z_4$. It has the configuration of an unterminated, low-pass filter comprising series inductors $L_4$, $L_5$, and $L_6$ and shunt capacitors $C_4$, $C_5$, $C_6$, $C_7$, and $C_8$. In general, the inductors will be unequal and also the capacitors will be unequal. For a proper choice of the reactance elements, an approximation to the linear phase characteristic 25 of Fig. 7 may be obtained. A change in the value of any of the component reactors will result in a somewhat complex change in the phase characteristic. These elements may be made adjustable, as indicated, to permit adjustment of the characteristic.

Fig. 9 shows a two-terminal impedance branch suitable for use as $Z_3$ or $Z_4$ when a delay characteristic of the harmonic type is desired. It comprises a plurality of similar, auxiliary, four-terminal, phase-shifting networks N5 connected in tandem and terminated at the remote end in an impedance $Z_5$ which may be either zero or infinite. The function of $Z_5$ is to provide substantially complete reflection of the incident waves. For example, $Z_5$ may be simply a short circuit or an open circuit. An impedance discontinuity X is provided at the input end and at each junction point between the networks N5. This may be either a shunt branch, as shown, or a series branch. If the insertion loss of the over-all circuit, as shown in Fig. 1, is to be constant, the impedances X must be purely reactive, and is preferably simply a capacitor. It may be made adjustable, as indicated, to provide adjustment of the phase characteristic.

Figure 10:
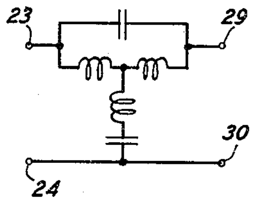
Figure 11:
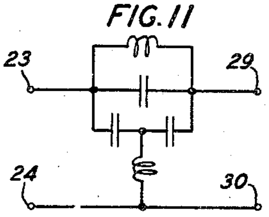

The auxiliary phase-shifting network N5 has a substantially linear phase characteristic which increases by $\pi/2$ radians over the operating frequency range. Its image impedance is resistive and preferably constant over this range. Figs. 10, 11, 12, and 13 show four suitable configurations. The networks of Figs. 10 and 11 are two equivalent, all-pass, bridged-T sections. The image impedance is a constant resistance and the phase shift may be made substantially linear over a considerable frequency range. As these sections are well known, they need not be described in detail here.

Figure 12:
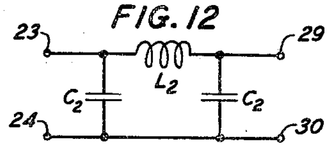

Fig. 12 is a mid-shunt, low-pass filter section of the constant-*k* type, comprising a series inductor $L_2$ and two equal shunt capacitors $C_2$, $C_2$. If its cut-off is placed well above the highest operating frequency, its image impedance will be sufficiently close to a constant resistance and its phase will be sufficiently linear over the operating range for the application at hand. The cut-off may, for example, be about three times the highest operating frequency. In this case, three tandem-connected sections will be required for each network N5 in order to obtain a substantially linear phase shift rising from zero to $\pi$-2 radians. As compared to the all-pass sections, the low-pass filter circuit has the advantage that the capacitances of its shunt capacitors $C_2$, $C_2$ may be furnished by the adjustable shunt impedances X, when these are capacitors, thus saving elements. The resulting structure is of the type shown in Fig. 8 except that the inductors are of equal value and only every third capacitor need be adjustable.

Figure 13:
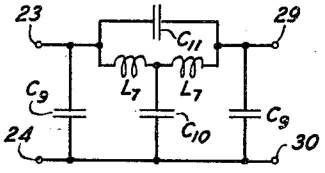

Fig. 13 shows another low-pass filter section suitable for use as the network N5. It comprises two equal shunt capacitors $C_9$, $C_9$ at the ends of a bridged-T portion made up of two equal series inductors $L_7$, $L_7$, an interposed shunt capacitor $C_{10}$, and a bridging capacitor $C_{11}$. Here, again, the cut-off frequency is placed well above the operating range. This is a non-minimum phase structure having a maximum phase shift of $3\pi$ radians. It is the equivalent of a constant-*k*, low-pass section of the type shown in Fig. 12 in tandem with an all-pass section having a maximum phase shift of $2\pi$ radians. Therefore, only a single section is ordinarily required to get a sufficiently linear phase shift of $\pi/2$ radians over the operating frequency range.

There will next be considered the phase characteristic obtainable with the circuit of Fig. 1 when the network N4 in the transmission path 11 is a shunt impedance $Z_3$ of the iterative type shown in Fig. 9. The network N3 in the path 6 will have a loss of approximately six decibels. It will be assumed that the impedance $Z_3$ comprises four auxiliary, tandem-connected, phase-shifting networks N5 and four associated shunt impedances X, each of which is an adjustable capacitor of normal value $C_x$. It will be further assumed that the terminating impedance $Z_5$ is infinite and that each network N5 has a phase shift which rises linearly from zero at zero frequency to $\pi/2$ radians at the upper limiting frequency $f_4$ of the operating range. Now, when each of the impedances X has its normal setting, the phase shift of the entire network will start from zero at zero frequency and increase substantially linearly to a value at $f_4$ which is equal to twice the sum of the phase shifts in all of the auxiliary networks N5. As shown by the solid-line curve 31 in Fig. 14, the normal phase characteristic in the case under consideration has a value of $4\pi$ radians at $f_4$.

A change in the setting of any of the reactances X will cause a corresponding change in the over-all phase characteristic. For example, if the value $C_x$ of the shunt capacitor at the input end of the last auxiliary network 32 (Fig. 9) is increased by an amount $\Delta C$, the phase characteristic shown by the dot-and-dash curve 34 is obtained. As referred to the normal characteristic 31, the curve 34 is essentially a half period of a sine curve, provided $\Delta C$ is comparatively small. This may be termed tht fundamental deviation characteristic. On the other hand, if $C_x$ is decreased by an amount $\Delta C$, the inverse phase deviation characteristic shown by the dot-and-dash curve 35 is obtained. It will be obvious that a whole family of similar deviation characteristics falling between the curves 34 and 35 may be obtained by choosing appropriate plus or minus values of $\Delta C$.

If the normal value $C_x$ of the capacitor connected directly across the input terminals 23, 24 ahead of the first auxiliary network 36 (Fig. 9) is increased by $\Delta C$ while the other three shunt capacitors remain at their normal setting, the phase deviation characteristic will be as shown by the broken-line curve 38 in Fig. 14. For small values of $\Delta C$, the curve 38 is essentially the fourth harmonic of the fundamental characteristic 34, when both curves are referred to the normal characteristic 31. A deviation characteristic inverse to the characteristic 38 may be obtained by decreasing the value of $C_x$ by an amount $\Delta C$.

If more harmonic deviation characteristics are desired, the number of the auxiliary networks N5 and associated shunt reactors X may be correspondingly increased. It is apparent, therefore, that any required number of harmonically related phase or delay deviation characteristics may be obtained with a single network of the type under consideration. If the adjustments $\Delta C$ are kept comparatively small, these different deviation characteristics will be substantially independent. That is, an adjustment of one characteristic will cause only a negligible, or very small, change in the other characteristics. Since it is known that any given characteristic may be resolved by Fourier analysis into a series of harmonically related sine curves, it follows that any phase or delay characteristic may be equalized with the network here described if enough auxiliary networks N5 and associated adjustable reactances X are employed.

It should be pointed out that changing the terminating impedance $Z_5$ from an indefinite value, as assumed above, to zero simply causes an inversion of the phase deviation characteristic. For example, if the characteristic 34 is obtained when $Z_5$ is infinite, the curve 35 will result when $Z_5$ is changed to zero, or a short circuit.

Fig. 15 shows another phase-shifting network in accordance with the invention. The circuit is similar to the one shown in Fig. 1 except that the attenuator N3 in the transmission path 6 has been replaced by an amplifier A1, and the amplifiers A2 and A3, one on each side of the network N4, have been added to the transmission path 11. Also, suitable circuits for the splitting network N1 and the combining network N2 are shown in detail. Each of the networks N1 and N2 comprises a three-winding hybrid coil H of the ordinary type and a balancing resistor $R_B$. In N1, the input terminals 2, 3 and the terminals 39, 40, across which $R_B$ is connected, form two conjugate pairs. The output terminals 41, 42 connected to the path 6 and the output terminals 43, 44 connected to the path 11 also constitute two conjugate pairs. The function of N1 is to split the input energy from the source 1 into independent portions which are supplied to the paths 6 and 11. The network N2 is of similar construction. Its function is to combine the energy received from the paths 6 and 11 and supply it to the load $R_L$.

The amplifiers may be of a standard type having an inherent phase reversal. Therefore, the difference in the phase shifts in the two paths 6 and 11 will be the required $\pi$ radians. The gains of the amplifiers are so adjusted that the transmission loss in the path 6 is approximately six decibels greater than that in the path 11. The amplifiers help to improve the input impedance of the network at the terminals 2, 3 and the output impedance at the terminals 4, 5. They also aid the networks N1 and N2 in preventing undesired interaction between the transmission paths 6 and 11. If the source and the load $R_L$ have sufficiently low impedances, the networks N1 and N2 may, in some cases, be omitted. The adjustable network N4 may take any of the forms described above in connection with Figs. 3 through 14. All of the phase-shift characteristics obtainable with the network of Fig. 1 may also be obtained with the circuit of Fig. 15.

Fig. 16 shows a modification of the circuit of Fig. 15 in which the amplifiers A1, A2, and A3 are replaced, respectively, by the networks N6, N7, and N8. When the amplifiers are omitted, the required difference of $\pi$ radians in the phase shifts in the paths 6 and 11 is obtained, as in Fig. 1, by properly poling the connections to the networks N1 and N2. Each of the networks N7 and N8 may be a fixed attenuator having a loss P which is large enough to provide the required uniformity in the input and output impedances of the entire circuit. The network N6 may be an adjustable attenuator of the type shown in Fig. 2, or a fixed pad, having a loss equal to 2P+6 decibels. If, for example, P is ten decibels, and each of the networks N1 and N2 introduces a loss of three decibels, the over-all loss will be 32 decibels. This amount can readily be made up in a single amplifier having a substantially flat gain characteristic. If the hybrid-coil networks N1 and N2 have sufficiently small reactive impedance components and the increased variation in the input and the output impedances can be tolerated, the attenuators N7 and N8 may be omitted entirely. Also, the network N6 may be a loss equilizer designed to compensate at least partially for deviations from the ideal loss in the path 11, and may also include phase correction.

Fig. 17 shows a phase-shifting network in accordance with the invention which may be used when the impedance of the source 1 and the load impedance $R_L$ are each sufficiently low. The circuit is similar to the one shown in Fig. 1 except that the splitting network N1 and the combining network N2 are omitted and the two parallel transmission paths 6 and 11 are connected directly to the source 1 and the load $R_L$. The function of preventing undesired interaction between the paths 6 and 11 is performed by the amplifier A4 located at the input end of the path 11 and the series resistor $R_4$ at the output end thereof. The network N3 introduces into the path 6 a loss which is approximately six decibels greater than the loss in the path 11. It is desirable that A4 be a high-gain amplifier stabilized by the use of negative feedback. The network N4 may take any of the forms described above in connection with the similarly designated network in Fig. 1. Any phase characteristic obtainable with the circuit of Fig. 1 may be duplicated in the circuit of Fig. 17.

Fig. 18 shows the detailed circuit of a network of the type shown in Fig. 17. The source 1 has a substantially resistive impedance of 75 ohms and the load $R_L$ a substantially resistive impedance of 1000 ohms. The attenuator N3 in the path 6 is a T-network of the type shown in Fig. 2. The amplifier A4 in the path 11, shown within the broken-line box, employs a single pentode tube 46 which may be of the 6AK5 type. The source 1 is connected directly to the signal grid of the tube 46. A 250-volt battery 47 supplies voltage to the plate through a resistor $R_5$ of 10,000 ohms and voltage to the screen grid through a dropping resistor $R_6$ of 39,000 ohms. The suppressor grid is tied to the cathode, which is indirectly heated. The cathode resistor $R_7$ has a value of 200 ohms and is by-passed by a half-microfarad capacitor $C_{11}$. The by-pass capacitor $C_{12}$ between the screen grid and the cathode also has a value of a half microfarad. The by-pass capacitor $C_{13}$ has a value of 0.1 microfarad. The blocking capacitor $C_{14}$ has a value of 0.01 microfarad. The parallel combination of the resistor $R_{15}$ of 200 ohms and the capacitor $C_{15}$ having a value of 0.01 microfarad is provided to make the amplifier A4 self-equalizing. The shunt output resistor $R_8$ has a value of 37.5 ohms.

The adjustable reactive impedance $Z_3$, connected in shunt between the terminals 23 and 24, is of the type shown in Fig. 6 and constitutes the network N4. The series resistor $R_4$ in the path 11 has a value of 1000 ohms. By adjusting either the inductors or the capacitors in the impedance $Z_3$, phase-shift deviation characteristics of the type shown in Fig. 7 may be obtained with the network.

Fig. 19 shows a phase-shifting network which is similar to Fig. 17 except that the amplifier A4 and the reactive network N4 in the branch 11 are replaced by an active network requiring only one type of reactive element. This active network, between the terminals 48, 49 and 50, 51, comprises a network N9 connected in tandem with an amplifier A5 which has a network N10 in the feedback path. Each of the networks N9 and N10 in made up of resistors and only inductors or capacitors. This circuit is ordinarily operated between a source 1 and a load $R_L$ of comparatively low impedance. The amplifier A5 introduces the desired phase reversal in the lower path and also aids the series resistor $R_4$ in reducing the interaction between the paths 6 and 11. Any physically realizable type of phase-shift characteristic may be obtained by properly designing the networks N9 and N10.

Fig. 20 shows a specific embodiment of a network of the type shown in Fig. 19 in which the reactors are capacitors. The series combination of the resistor $R_9$ and the capacitor $C_{16}$ constitutes the network N9. The feedback network N10 is a bridged-T structure comprising two equal series capacitors $C_{17}$, $C_{17}$, an interposed shunt resistor $R_{10}$, and a bridging resistor $R_{11}$. The network N3 is constituted by the series resistor $R_{12}$, the value of which is chosen to make the loss in the path 6 approximately six decibels greater than the minimum loss in the path 11. The impedance $R_S$ of the source 1 may be made sufficiently low, as viewed at the input terminals 2 and 3, by interposing the feedback amplifier A6. In the same way, the impedance connected to the output terminals 4 and 5 may be made low enough if a feedback amplifier A7 is connected between these terminals and the utilization circuit represented by the resistor $R_{14}$. The network as a whole will have a substantially constant insertion loss and a miximum phase shift of $2\pi$ radians. It may be designed to have a substantially linear phase-frequency characteristic, with a corresponding constant delay, or it may be designed to provide a bump of delay having a maximum the magnitude and frequency of which may be preselected. This circuit is particularly useful for operation at low frequencies, because no component inductors are required. Other all-pass networks usually require inductors which, for low-frequency operation, are uneconomically large.

Fig. 21 shows another modification of the circuit of Fig. 17 which requires no amplifier. The transmission path 11 comprises a passive network N11, a transformer 53, and the series resistor $R_4$ connected in tandem. The network N11 may be made up of resistors and only one type of reactor. The transformer 53 provides the required phase reversal. The resistor $R_4$ keeps the interaction between the paths 6 and 11 sufficiently low. The network N3, which may be simply a series resistor, provides a loss in the path 6 which exceeds the minimum loss in the path 11 by approximately six decibels when a constant insertion loss is desired. This circuit, also, preferably operates between a low-impedance source 1 and a low-impedance load $R_L$. For a maximum over-all phase shift of $\pi$ radians, the network N11 may have the configuration shown in Fig. 22, which enploys the same terminal designations used in Fig. 21. This is a T-structure comprising two series resistors $R_{13}$, $R_{14}$ and an interposed shunt capacitor $C_{18}$. These elements may be proportioned to provide a phase shift of $\pi/2$ radians at a selected frequency. The flat loss of this circuit is quite high, but it may be made up in an associated amplifier.

It is to be understood that the above-described arrangements are illustrative of the application of the principles of the invention. Numerous other arrangements may be devised by those skilled in the art without departing from the spirit and scope of the invention.

What is claimed is:

1. A constant-loss delay network comprising a splitting network, a combining network, and two substantially independent transmission paths connected therebetween, the first of the paths including a reactive impedance comprising a plurality of resonant branches connected in parallel and having a transmission loss which varies between a minimum at a first frequency and a maximum large compared to the minimum at a second frequency, the second path having a substantially constant transmission loss approximately six decibels greater than said minimum, and the paths having phase shifts which differ by approximately $\pi$ radians at the first frequency.

2. A network in accordance with claim 1 in which the resonant frequencies of said branches are adjustable.

3. A network in accordance with claim 1 in which the resonant frequencies of said branches are equally spaced.

4. A delay network comprising a splitting network, a combining network, and two substantially independent transmission paths connected therebetween, the first of the paths including a reactive shunt branch which is antiresonant at a first frequency and resonant at a second frequency, the second path having a substantially constant transmission loss approximately six decibels greater than that in the first path at the first frequency, and the paths having phase shifts which differ by approximately $\pi$ radians at the first frequency.

5. A network in accordance with claim 4 in which the impedance of the branch has a magnitude approximately equal to the parallel combination of the impedances looking in either direction therefrom at a frequency mid-way between the two frequencies.

6. A delay network comprising a splitting network at the input end, a combining network at the output end, and two substantially independent transmission paths connecting the splitting network and the combining network, the first of the paths including two attenuators and an interposed shunt branch which is antiresonant at a first frequency and resonant at a second frequency, the second path having a substantially constant transission loss approximately six decibels greater than that in the first path at the first frequency, and the paths differing in phase shift by approxiately $\pi$ radians at the first frequency.

7. A network in accordance with claim 6 in which said second path includes an attenuator.

8. A network in accordance with claim 4 in which the branch has the configuration of an unterminated, low-pass filter comprising series inductors and shunt capacitors.

9. A network in accordance with claim 4 in which the branch comprises a plurality of auxiliary networks connected in tandem, a reflecting termination, and adjustable impedances interposed between the auxiliary networks, each of the auxiliary networks having an image impedance which is approximately constant and a phase shift which is approximately linear over the operating frequency range.

References Cited in the file of this patent

UNITED STATES PATENTS

| | | |
|---|---|---|
| 1,759,952 | McCurdy | May 27, 1930 |
| 2,241,615 | Plebanski | May 13, 1941 |
| 2,298,177 | Scott | Oct. 6, 1942 |
| 2,641,645 | Artzt | June 9, 1953 |
| 2,716,220 | Saraga | Aug. 23, 1955 |

FOREIGN PATENTS

| | | |
|---|---|---|
| 594,431 | Great Britain | Nov. 11, 1947 |